(12) United States Patent
Toulouse et al.

(10) Patent No.: US 12,158,803 B2
(45) Date of Patent: Dec. 3, 2024

(54) SYSTEM AND METHOD FOR ENVIRONMENTAL CONTROL

(71) Applicant: Dell Products L.P., Round Rock, TX (US)

(72) Inventors: Michael Mitsuo Toulouse, San Jose, CA (US); Benjamin David Behrendt, Round Rock, TX (US); Tyler Baxter Duncan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 74 days.

(21) Appl. No.: 17/971,148

(22) Filed: Oct. 21, 2022

(65) Prior Publication Data
US 2024/0134738 A1 Apr. 25, 2024
US 2024/0232001 A9 Jul. 11, 2024

(51) Int. Cl.
*G06F 11/00* (2006.01)
*G06F 11/07* (2006.01)
*G06F 11/14* (2006.01)
*G06F 11/30* (2006.01)

(52) U.S. Cl.
CPC ...... *G06F 11/0796* (2013.01); *G06F 11/1443* (2013.01); *G06F 11/3058* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 2017/0357299 A1* | 12/2017 | Shabbir | H05K 7/20836 |
| 2020/0034268 A1* | 1/2020 | Ganesan | G06F 11/3072 |
| 2020/0034269 A1* | 1/2020 | Ganesan | G06F 17/18 |
| 2021/0157694 A1* | 5/2021 | Dye | H04L 41/0659 |
| 2022/0247812 A1* | 8/2022 | Mehta | H04L 67/1031 |
| 2024/0015925 A1* | 1/2024 | Cho | H05K 7/20718 |

OTHER PUBLICATIONS

Google Scholar/Patents search—text refined (Year: 2024).*

* cited by examiner

*Primary Examiner* — Christopher S McCarthy
(74) *Attorney, Agent, or Firm* — Chamberlain, Hrdlicka, White, Williams & Aughtry; Aly Dossa

(57) ABSTRACT

An information handling system includes multiple components and multiple zones, with each zone including a portion of a total number of the components. The information handling system also includes a processor programmed to determine that a communication failure has occurred with one of the components of the information handling system, identify a zone of the multiple zones that includes the one of the components; and instruct the zone to switch to a default mode.

11 Claims, 5 Drawing Sheets

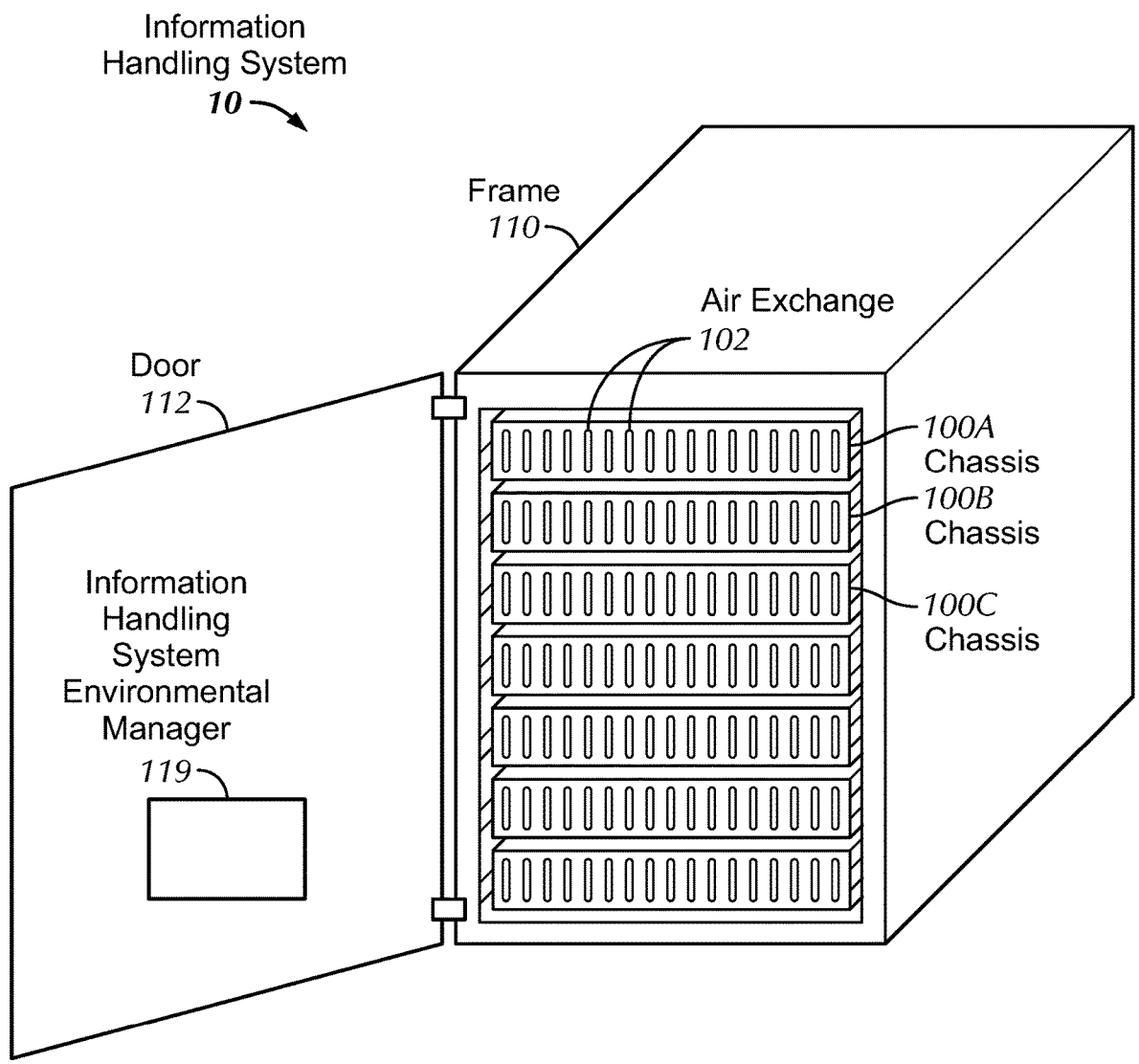
FIG. 1.1

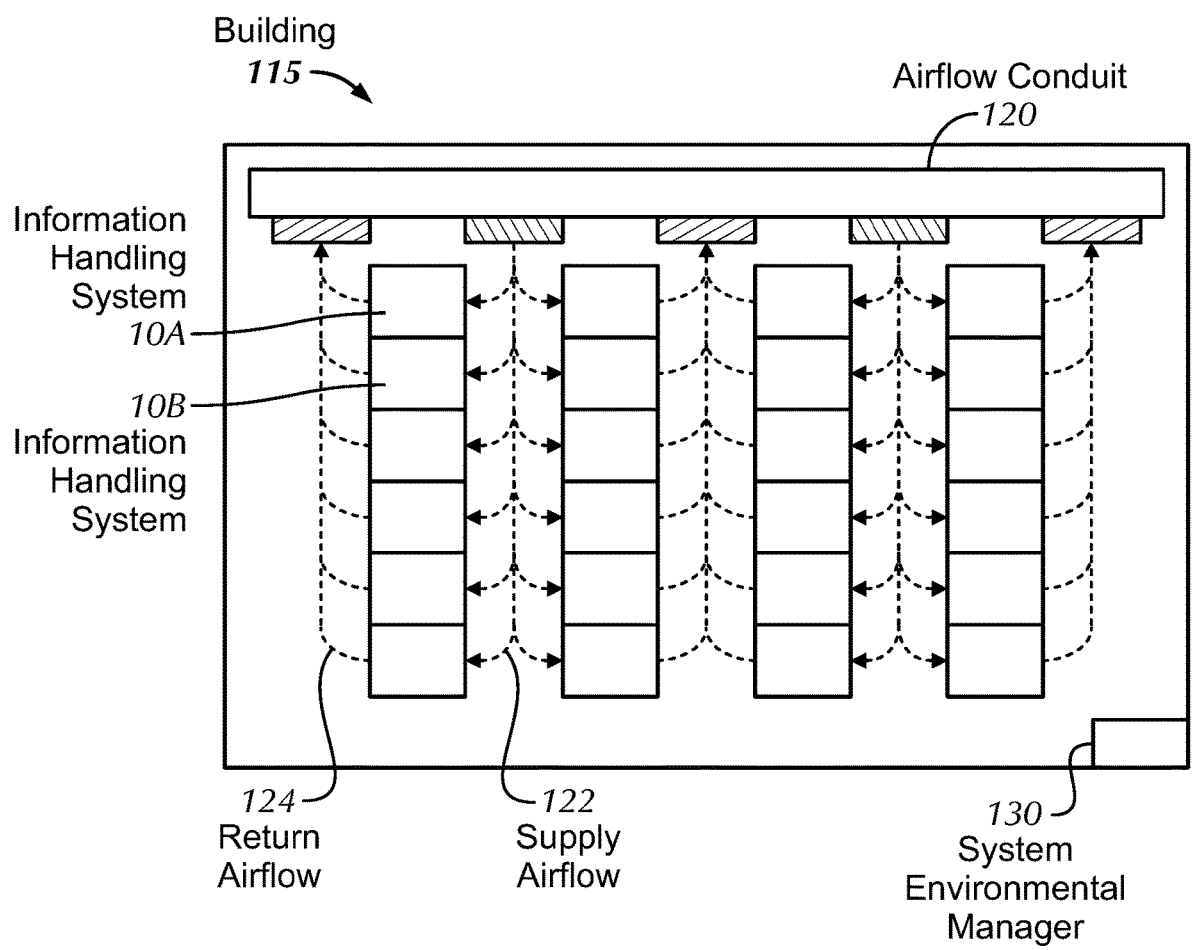
FIG. 1.2

SYSTEM AND METHOD FOR ENVIRONMENTAL CONTROL

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use cases for information handling systems are causing progressively larger number of information handling systems to be disposed near each other. For example, rack mount systems utilize a rack structure to stack two or more chassis in an information handling system. Due to the changing uses of information handling systems, chassis therein may be modular allowing for continual partial upgrades to the information handling system. That is, an information handling system may be composed of multiple chassis that may be attached to each other to form the information handling systems. When the multiple chassis are attached, components of the information handling system disposed in each of the chassis may become operably connected to each other.

SUMMARY

In one aspect, an information handling system in accordance with one or more embodiments of the invention includes multiple components and multiple zones, with each zone including a portion of a total number of the components. The information handling system also includes a processor programmed to determine that a communication failure has occurred with one of the components of the information handling system, identify a zone of the multiple zones that includes the one of the components; and instruct the zone to switch to a safe mode.

In one aspect, a method for managing component level operations of an information handling system in accordance with one or more embodiments of the invention includes creating multiple zones, with each zone including a portion of a total number of components contained within the information handling system. The method also includes determining that a communication failure has occurred with one of the components of the information handling system. Further, the method includes identifying a zone of the multiple zones that includes the one of the components, and instructing the zone to switch to a safe mode.

In one aspect, a non-transitory computer readable medium includes computer readable program code, which when executed by a computer processor enables the computer processor to perform a method for monitoring environmental conditions at a component of an information handling system, the method in accordance with one or more embodiments of the invention includes creating multiple zones, with each zone including a portion of a total number of components contained within the information handling system. The method also includes determining that a communication failure has occurred with one of the components of the information handling system. Further, the method includes identifying a zone of the multiple zones that includes the one of the components, and instructing the zone to switch to a safe mode.

Other aspects of the invention will be apparent from the following description and the appended claims.

BRIEF DESCRIPTION OF DRAWINGS

FIG. 1.1 shows a diagram of an information handling system in accordance with one or more embodiments of the invention.

FIG. 1.2 shows a diagram of a building that includes information handling systems in accordance with one or more embodiments of the invention.

DETAILED DESCRIPTION

Figure 2:
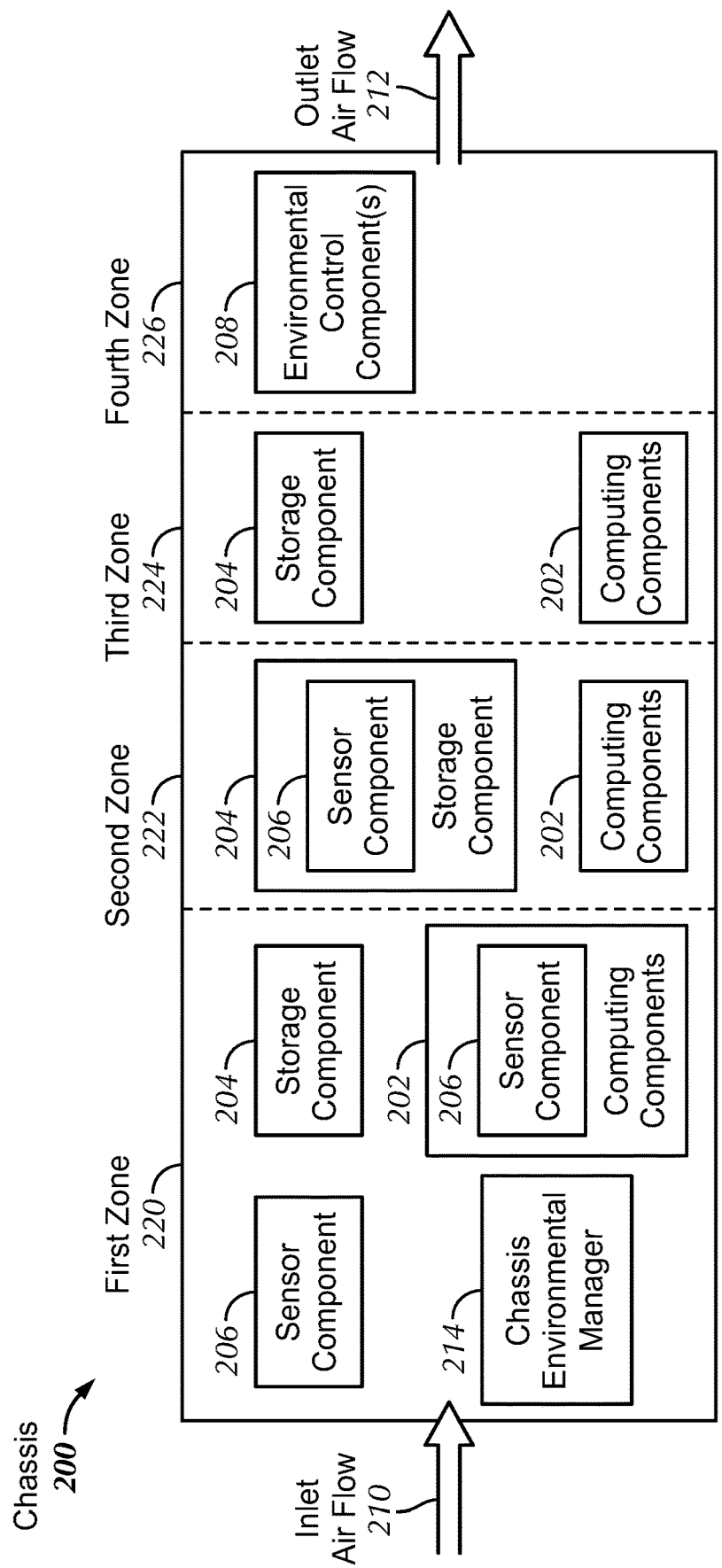
FIG. 2 shows a diagram of a chassis of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing components of an information handling system. An information handling system (IHS) may be a system that provides computer-implemented services. These services may include, for example, database services, electronic communication services, data storage services, etc.

To provide these services, the information handling system may include one or more computing devices. The computing devices may include any number of computing components that facilitate providing of the services of the information handling system. The computing components may include, for example, processors, memory modules, circuit cards that interconnect these components, etc.

During operation, these components may include sensors and other data that are used in a feedback system to control the environmental conditions experienced by these components. However, communication of this data is not fully reliable and fails from time-to-time, leaving control systems with unreliable data or no data with which to control the environmental conditions experienced by the components.

Embodiments of the invention may provide methods and systems that manage environmental conditions during a loss of communication. To manage environmental conditions, a system may instruct certain components to enter into a safe mode to prevent damage to components caused by adverse environmental conditions, while still maintaining operation of the components.

To prevent damage to components, embodiments of the invention may create zones with each zone including one or more components of the IHS. When a communication failure occurs with one of the components, embodiments of the invention may identify the zone associated with the component experiencing a communication failure. Then, embodiments of the invention may instruct all components within the zone to enter into a safe mode.

By doing so, a system in accordance with embodiments of the invention may isolate communication failures to smaller portions of the total number of components in an IHS, may reduce time spent in a safe mode for all components, may lower IT failure rates due to components operating in adverse environmental conditions, may reduce the complexity of safe mode operations, may reduce costs in implement redundant control systems, and/or may increase resiliency. Embodiments of the invention may provide other advantages.

FIG. 1.1 shows an information handling system (10) in accordance with one or more embodiments of the invention. The system may include a frame (110) and any number of chassis (e.g., 100A, 100B, 100C).

As will be discussed in greater detail below, the information handling system (10) may include any number of components that affect environmental controls for the information handling system (10). For example, the components may include temperature sensors, humidity sensors, dampers, pumps, variable frequency drives, air flow rate sensors, filter pressure sensors, flow meters, power supply monitors, or any other device that may affect or monitor environmental conditions in the information handling system (10).

The frame (110) may be a mechanical structure that enables chassis to be positioned with respect to one another. For example, the frame (110) may be a rack mount enclosure that enables chassis to be disposed within it. The frame (110) may be implemented as other types of structures adapted to house, position, orient, and/or otherwise physically, mechanically, electrically, and/or thermally manage chassis (e.g., direct airflows to the chassis). By managing the chassis, the frame (110) may enable multiple chassis to be densely packed in space without negatively impacting the operation of the information handling system (10). The frame may also include a door (112) to selectively provide access to the interior of the frame (110).

A chassis (e.g., 100A) may be a mechanical structure for housing components of an information handling system. For example, a chassis may be implemented as a rack mountable enclosure for housing components of an information handling system. The chassis may be adapted to be disposed within the frame (110) and/or utilize services provided by the frame (110) and/or other devices.

Any number of components may be disposed in each of the respective chassis (e.g., 100A, 100B, 100C). These components may be portions of computing devices that provide computer implemented services and/or portions of environmental control systems, discussed in greater detail below.

When the components provide computer implemented services, the components may generate heat. For example, the components may utilize electrical energy to perform computations and generate heat as a byproduct of performing the computations. If left unchecked, a buildup of heat within a chassis may cause temperatures of the components disposed within the chassis to exceed preferred ranges.

The preferred ranges may include a nominal range in which the components respectively operate: (i) without detriment and/or (ii) are likely to be able to continue to operate through a predetermined service life of a component. Consequently, it may be desirable to maintain the temperatures of the respective components within the preferred range (e.g., a nominal range).

When a component operates outside of the preferred range, the service life of the component may be reduced, the component may not be able to perform optimally (e.g., reduced ability to provide computations, higher likelihood of error introduced into computations, etc.), and/or the component may be more likely to unexpectedly fail. The component may be subject to other undesirable behavior when operating outside of the preferred range without departing from the invention.

To operate components within the preferred range of temperature, the chassis may include air exchanges (e.g., 102). An air exchange may be one or more openings in an exterior of a chassis that enables the chassis to exchange gases with an ambient environment. For example, a chassis may utilize air exchanges to (i) vent hot gases and (ii) intake cool gases. By doing so, the temperature of the gases within the chassis may be reduced. Consequently, the temperatures of components within the chassis may be reduced by utilizing the cooler gases taken into the chassis via an air exchange.

However, control of the temperature requires communication between the components and a control system, such as an information handling system environmental manager (119), which may be a computing device programmed to (i) obtain information regarding the operation of the information handling system and/or one or more chassis therein and (ii) set the operating conditions of components. By doing so, the information handling system environmental manager (119) may adjust the environmental conditions within the information handling system (10).

To decide how to set the operating points of the information handling system heater, the information handling system environmental manager (119) may obtain and/or be provided information regarding the environmental conditions (e.g., temperatures, relative humidity levels, flow rates, pressure levels) within each of the chassis. For example, the system information system environmental manager (119) may be operably connected to environmental managers of each of the chassis and/or the information handling system heater (196.3) via any combination of wired and/or wireless networks. The respective environmental managers of the chassis may provide such information to the information handling system environmental manager (119) and/or service requests regarding the operating points of the components via the operable connections.

The information handling system environmental manager (119) may create a number of zones, with each zone including a portion of the components within the information handling system (10). However, in some instances, communication between one or more of the components and the information handling system environmental manager (119) may fail. In this instance, the information handling system environmental manager (119) identifies a zone associated with the component experiencing a communication failure and instructs all components within the zone to enter into a safe mode (i.e., a state (which may be a default state, a state set by the user or any other entity, that maintains operation of the components in a manner that reduces risk of damage to components)). By doing so, the information handling system environmental manager (119) may maintain control over portions of the information handling system (10) that are not experiencing a communication failure, while providing safe mode operation to portions that are experiencing a communication failure. Said another way, when a component enters a safe mode, the components no longer receive control signals from a system environmental manager (e.g., 130, FIG. 1.2), the information handling system environmental manager (e.g., 119, FIG. 1.1), and/or the environmental chassis manager (214) (i.e., they are not actively controlled using, e.g., one of the aforementioned managers); instead, once in the safe mode, the components continue to run in an unoptimized state relying on the electrical and mechanical design of the components to enable them to continue to operate (e.g., controlling temperature of the component by running fans at high speed using unconditioned outside air).

In one or more embodiments of the invention, the information handling system environmental manager (119) is implemented using computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the information handling system environmental manager (119) described through this application and all, or a portion, of the method illustrated in FIG. 3. The information handling system environmental manager (119) may be implemented using other types of computing devices without departing from the invention. For additional details regarding computing devices, refer to FIG. 4.

In one or more embodiments of the invention, the information handling system environmental manager (119) may be implemented using a hardware device including circuitry. The information handling system environmental manager (119) may be implemented using, for example, a digital signal processor, a field programmable gate array, or an application specific integrated circuit. The information handling system environmental manager (119) may be implemented using other types of hardware devices without departing from the invention.

In one or more embodiments of the invention, the information handling system environmental manager (119) is implemented using computing code stored on a persistent storage that when executed by a processor performs all, or a portion, of the functionality of the information handling system environmental manager (119). The processor may be a hardware processor including circuitry such as, for example, a central processing unit or a microcontroller. The processor may be other types of hardware devices for processing digital information without departing from the invention.

In one or more embodiments of the invention, the information handling system environmental manager (119) is implemented using distributed computing devices. As used herein, a distributed computing device refers to functionality provided by a logical device that utilizes the computing resources of one or more separate and/or distinct computing devices. For example, in one or more embodiments of the invention, the information handling system environmental manager (119) is implemented using distributed devices that include components distributed across any number of separate and/or distinct computing devices. In such a scenario, the functionality of the information handling system environmental manager (119) may be performed by multiple, different computing devices without departing from the invention.

To further clarify the environments in which management of environmental conditions may arise, a diagram of an environment in which chassis of IHSs may reside is illustrated in FIG. 1.2 and a diagram of a chassis is provided in FIG. 2.

Turning to FIG. 1.2, FIG. 1.2 shows a top view diagram of a building (115) in which chassis of IHSs may reside in accordance with one or more embodiments of the invention. The building (115) may house a data center (e.g., an aggregation of information handling systems) that includes any number of information handling systems (e.g., 10A, 10B). The information handling systems may include chassis, which may need to take in and exhaust gases for temperature regulation purposes due to heat generation by components disposed in the chassis.

To facilitate gas management within the building (115), the information handling systems may be organized into rows (or other groupings of information handling systems). In FIG. 1.2, the rows of information handling systems extend from top to bottom along the page. To enable gases to be provided to the information handling systems (e.g., for temperature regulation purposes), an airflow conduit (120) may be disposed within the building. The airflow conduit (120) may provide supply airflow (122) and take in a return airflow (124). These airflows are illustrated as arrows having dashed tails.

The supply airflow (122) may be at a lower temperature than the return airflow (124). Consequently, when information handling systems obtain portions of the supply airflow (122), the information handling systems may be able to utilize the supply airflow (122) to cool components disposed within the chassis of the information handling systems. For example, gases from the supply airflow (122) may be passed by components disposed within chassis of information handling systems that are at elevated temperatures. The gases may be at a lower temperature than the components. Consequently, thermal exchange between the gases and the components may decrease the temperature of the components.

After utilizing the gases from the supply airflow (122), the information handling systems may exhaust the gases as the return airflow (124). After being exhausted from the information handling systems, the return airflow (124) may be obtained by the airflow conduit (120), cooled, and recirculated as the supply airflow (122). Further, some of the return airflow (124) may be exhausted out of the building (115).

In addition to cooling the return airflow (124), the airflow conduit (120) may be capable of obtaining gases from other areas (e.g., outside of the building), reducing the humidity level of an airflow, and/or otherwise conditioning gases for use by information handling systems and/or other devices.

In some embodiments, the airflow conduit (120) may not condition the gases passing through it. For example, the airflow conduit (120) may obtain air from outside of the building (115), supply the outside air as the supply airflow (122) and then receive the return airflow (124) and exhaust the return airflow (124) outside of the building.

To manage the aforementioned process, a system environmental manager (130) may be disposed within the building (115) or at other locations. The system environmental manager (130) may be a computing device programmed to (i) obtain information regarding the operation of the information handling systems and (ii) set the operating points of the airflow conduit (120). By doing so, the system environmental manager (130) may cause the airflow conduit (120) to provide gases to the information handling systems having a temperature and/or humidity level that may better enable the information handling systems to regulate their respective environmental conditions within the chassis of the respective information handling systems. However, conditioning the supply airflow (122) may utilize large amounts of energy.

The airflow conduit (120) may include functionality to granularly, or at a macro level, modify the temperature and/or humidity level of the supply airflow (122). Consequently, different information handling systems (or groups thereof) may receive different supply airflows (e.g., 122) having different characteristics (e.g., different temperatures and/or humidity levels, different sources, etc.).

Conditioning the return airflow (124) or gases obtained from outside of the building (115) may be costly, consume large amounts of electricity, or may otherwise be undesirable. To reduce these costs, the system environmental manager (130) may set the operating point (e.g., desired temperature/humidity levels of different portions of the supply airflow (122)) of the airflow conduit (120) to only provide the minimum necessary characteristics required by each of the IHSs so that it meets is service life goals. By doing so, the cost of providing the supply airflow (122) having characteristics required to meet the environmental requirements of the chassis of the information handling systems may be reduced.

To decide how to set the operating points of the airflow conduit (120), the system environmental manager (130) may obtain and/or be provided information regarding the environmental conditions (e.g., temperatures, relative humidity levels, corrosion rates of components) within each of the chassis. For example, the system environmental manager (130) may be operably connected to environmental managers of each of the chassis and/or the airflow conduit (120) via any combination of wired and/or wireless networks. The respective environmental managers of the chassis may provide such information to the system environmental manager (130) and/or service requests regarding the operating points of the airflow conduit (120) via the operable connections. Further, the system environmental manager (130) may include or be a part of the information handling system environmental manager (119) in FIG. 1.1.

The system environmental manager (130) may create a number of zones, with each zone including a portion of the components within one or more of the information handling systems. For example, one zone may include components from a single chassis within an information handling system to components contained within multiple information handling systems. However, in some instances, communication between one or more of the components and the system environmental manager (130) may fail. In this instance, the system environmental manager (130) identifies a zone associated with the component experiencing a communication failure and instructs all components within the zone to enter into a safe mode. By doing so, the system environmental manager (130) may maintain control over portions of the information handling system that are not experiencing a communication failure, while providing safe mode operation to portions that are experiencing a communication failure.

In one or more embodiments of the invention, the system environmental manager (130) is implemented using computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the system environmental manager (130) described through this application and all, or a portion, of the method illustrated in FIG. 3. The system environmental manager (130) may be implemented using other types of computing devices without departing from the invention. For additional details regarding computing devices, refer to FIG. 4.

In one or more embodiments of the invention, the system environmental manager (130) may be implemented using a hardware device including circuitry. The system environmental manager (130) may be implemented using, for example, a digital signal processor, a field programmable gate array, or an application specific integrated circuit. The system environmental manager (130) may be implemented using other types of hardware devices without departing from the invention.

In one or more embodiments of the invention, the system environmental manager (130) is implemented using computing code stored on a persistent storage that when executed by a processor performs all, or a portion, of the functionality of the system environmental manager (130). The processor may be a hardware processor including circuitry such as, for example, a central processing unit or a microcontroller. The processor may be other types of hardware devices for processing digital information without departing from the invention.

In one or more embodiments of the invention, the system environmental manager (130) is implemented using distributed computing devices. As used herein, a distributed computing device refers to functionality provided by a logical device that utilizes the computing resources of one or more separate and/or distinct computing devices. For example, in one or more embodiments of the invention, the system environmental manager (130) is implemented using distributed devices that include components distributed across any number of separate and/or distinct computing devices. In such a scenario, the functionality of the system environmental manager (130) may be performed by multiple, different computing devices without departing from the invention.

Turning to FIG. 2, FIG. 2 shows a diagram of a chassis (200) in accordance with one or more embodiments of the invention. A chassis may be a portion of an IHS and/or house all, or a portion, of an IHS. An information handling system may include a computing device that provides any number of services (e.g., computing implemented services). To provide services, the computing device may utilize computing resources provided by computing components (202) and storage resource provided by storage components (204). The computing components (202) may include, for example, processors, memory modules, storage devices, special purpose hardware, and/or other types of physical components that contribute to the operation of the computing device. The storage components (204) may include non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), and/or other types of storage components that contribute to the operation of the computing device. For additional details regarding computing devices, refer to FIG. 4.

Because the computing device uses computing components (140) to provide services, the ability of the computing device to provide services is limited based on the number and/or quantity of computing devices that may be disposed within the chassis. For example, by adding additional processors, memory modules, and/or special purpose hardware devices, the computing device may be provided with additional computing resources, which may be used to provide services. Consequently, large number of computing components that each, respectively, generate heat may be disposed within the chassis.

To maintain the temperatures of the computing components (140) (and/or other types of components) within a nominal range, gases may enter the chassis as an inlet air flow (210). The gases may be passed by the computing components (140) to exchange heat with them. The heated gases may then be expelled as an outlet air flow (212).

To manage the environmental conditions of the chassis (200), the chassis (200) may include a chassis environmental manager (214). The chassis environmental manager (214) may provide environmental management services. Environmental management services may include: (i) obtaining information regarding the environmental conditions of the chassis and/or components within chassis (e.g. via sensor components (206)), and/or (ii) modifying the operation (e.g., modifying operating points) of environmental control components (208).

In one or more embodiments of the invention, the chassis environmental manager (214) is implemented using computing devices. The computing devices may be, for example, mobile phones, tablet computers, laptop computers, desktop computers, servers, distributed computing systems, embedded computing devices, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the chassis environmental manager (214) described through this application and all, or a portion, of the method illustrated in FIG. 3. The chassis environmental manager (214) may be implemented using other types of computing devices without departing from the invention. For additional details regarding computing devices, refer to FIG. 4.

In one or more embodiments of the invention, the chassis environmental manager (214) may be implemented using a hardware device including circuitry. The chassis environmental manager (214) may be implemented using, for example, a digital signal processor, a field programmable gate array, or an application specific integrated circuit. The chassis environmental manager (214) may be implemented using other types of hardware devices without departing from the invention.

In one or more embodiments of the invention, the chassis environmental manager (214) is implemented using computing code stored on a persistent storage that when executed by a processor performs all, or a portion, of the functionality of the chassis environmental manager (214). The processor may be a hardware processor including circuitry such as, for example, a central processing unit or a microcontroller. The processor may be other types of hardware devices for processing digital information without departing from the invention.

In one or more embodiments of the invention, the chassis environmental manager (214) is implemented using distributed computing devices. As used herein, a distributed computing device refers to functionality provided by a logical device that utilizes the computing resources of one or more separate and/or distinct computing devices. For example, in one or more embodiments of the invention, the chassis environmental manager (214) is implemented using distributed devices that include components distributed across any number of separate and/or distinct computing devices. In such a scenario, the functionality of the chassis environmental manager (214) may be performed by multiple, different computing devices without departing from the invention.

To enable the chassis environmental manager (214) to provide its functionality, the chassis (200) may include a number of sensor components (206) that may aid in managing the environmental conditions within the chassis. For example, the sensor components (206) may include temperature sensors, humidity sensors, flow rate sensors, filter pressure sensors, flow meters, power supply monitors, and/or any other sensor, which may assist in providing data for controlling the environmental conditions. Any number of sensor components (206) may be disposed ay any number of locations throughout the chassis (200).

In some embodiments of the invention, the functionality of the sensor components (206) may be provided by, in all or in part, the computing components (202). For example, the computing components (202) may include functionality to report their respective temperatures and/or humidity levels of the internal environment of the chassis (200).

Further, the chassis (200) includes one or more environmental control components (208) to control the environmental conditions within the chassis. The environmental control components (208) may include, for example, fans, heat exchangers, variable frequency drives, dampers, baffles, pumps, air conditioning units, and/or any other types of physical components that contribute to the management of the environmental conditions within the chassis. For example, the environmental control components (208) may control the rate and direction of airflow through the chassis (200) and/or otherwise modify the rate of heat exchange between air flowing through the chassis (200) and components contained within the chassis (200).

As an additional example, the environmental control components (208) may include components that are not disposed in the chassis (not shown). For example, the environmental control components may include an airflow conduit discussed with respect to FIG. 1.2. These external components may be used in conjunction with the environment control components disposed within the chassis to manage the temperature and/or relative humidity levels throughout the internal environment of the chassis as well as those of gases as they are taken into and/or expelled by the chassis (200). However, the use of airflow conduits or other macro-level airflow conditioners may be avoided due to the lower level of discrimination available for conditioning gases using such devices.

The chassis (200) may include any number and type of environmental control components without departing from the invention. Any of the environmental control components may be implemented using physical devices operably connected to and/or controllable by the chassis environmental manager (214) and/or a system environmental manager (e.g., 130, FIG. 1.2) (alone or in combination).

The chassis (200) may be split into a number of zones, with each zone including a portion of the components. For example, the chassis (200) is shown having four zones, a first zone 220 including a computing component (202), a storage component (204), sensor components (206) and the chassis environmental manager (214), a second zone including a computing component (202), a storage component (204), and a sensor component (206), a third zone including a computing component (202) and a storage component (204), and a fourth zone including the environmental control components (208). However, the chassis may be split into any number of zones, with each zone including any number or combination of different components. For example, all of the components within the chassis (200) may be in a single zone, or all of the components of the chassis and some or all of the components of one or more other chassis may be included in a single zone.

The chassis environmental manager (214) may communicate with all of the components in each of the zones. When a communication failure (i.e., no data is being received, the received data is deemed unreliable, different data streams are contradictory, or any other issue that may cause the data to be untrustworthy) is detected, then the chassis environmental manager (214) identifies the zone associated with the component. Then, the chassis environmental manager (214) determines whether operation of the other zones can reliably continue. If the chassis environmental manager (214) determines that operation of the other zones can reliably continue, the chassis environmental manager (214) will instruct all components within the zone including the affected component to enter into a safe mode while maintaining normal operation of all other zones. By doing so, the chassis environmental manager (214) may maintain control over portions of the chassis that are not experiencing a communication failure, while providing safe mode operation to portions that are experiencing a communication failure.

Any number of chassis environmental managers and system environmental managers may cooperatively operate to control the temperature and/or relative humidity levels to control the rate of environmental conditions within the chassis and/or manage the thermal load generated by the computing components (140) and/or other components.

To cooperatively operate, the chassis environmental managers, the information handling system environmental managers, and the system environmental managers may be operably connected to each another (e.g., via wired and/or wireless networks). The aforementioned components may share information with one another (e.g., detector data, operating set points of different environmental control components, etc.). These components may implement any type of model for controlling and/or delegating control of the system for temperature, relative humidity level, and/or other environmental conditions. When providing their respective functionalities, these components may perform all, or a portion, of the method illustrated in FIG. 3. Additionally, any capability and functionality described herein with respect to any specific environmental manager may be performed by any of the disclosed environmental managers (i.e., the chassis environmental managers, the information handling system environmental managers, and the system environmental managers). Any of these components may be implemented using a computing device. For additional details regarding computing devices, refer to FIG. 4.

While the chassis (200) of FIG. 2 has been illustrated as including a limited number of specific components, a chassis in accordance with one or more embodiments of the invention may include additional, fewer, and/or different components without departing from the invention. Additionally, while the chassis (200) is illustrated as having a specific form factor (e.g., rack mount), a chassis in accordance with embodiments of the invention may have different form factors without departing from the invention.

Figure 3:
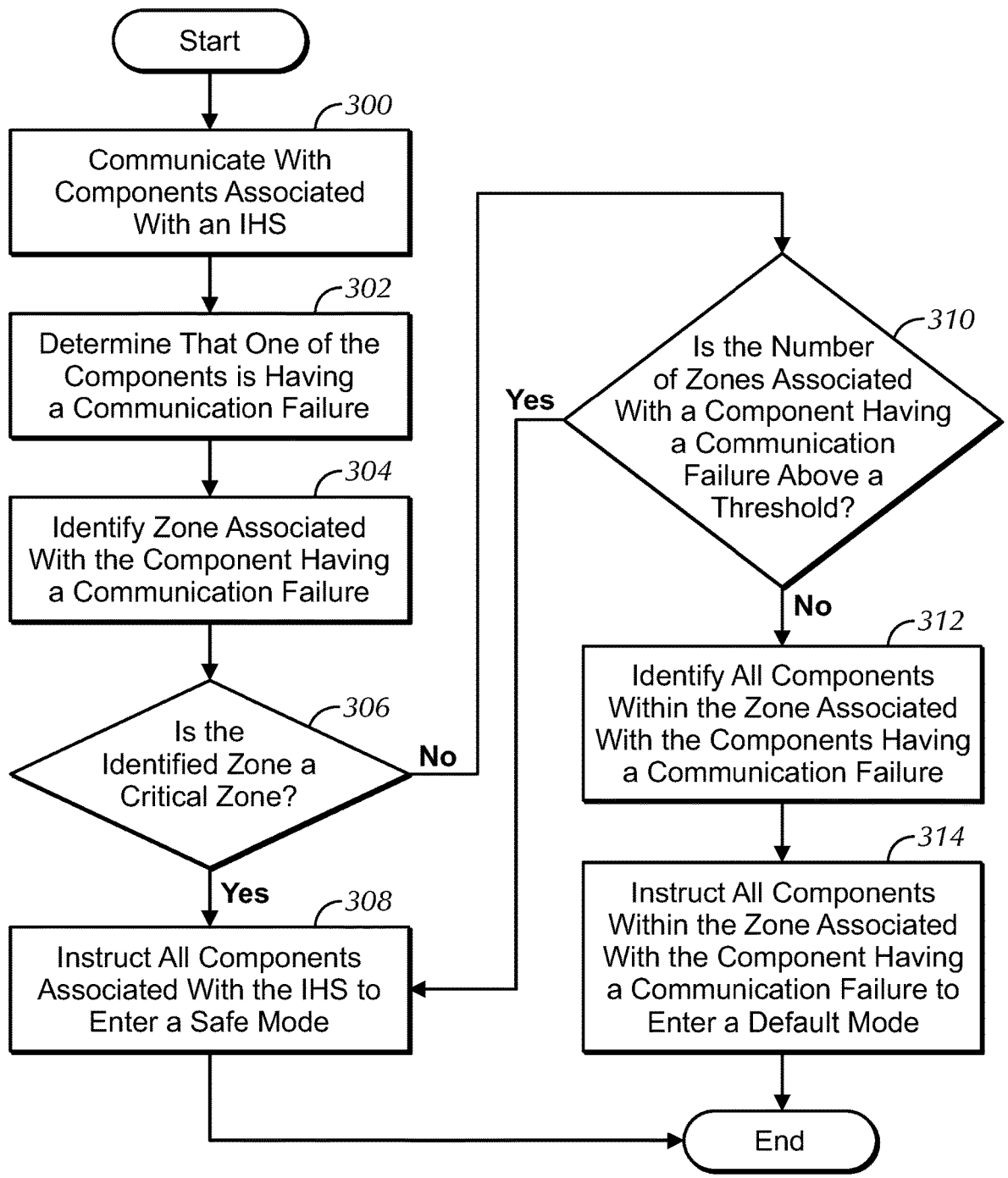
FIG. 3 shows a flowchart of a method of managing environmental conditions in accordance with one or more embodiments of the invention.

FIG. 3 shows a flowchart of a method in accordance with one or more embodiments of the invention. The method depicted in FIG. 3 may be used to manage a chassis environment in accordance with one or more embodiments of the invention. The method shown in FIG. 3 may be performed by, for example, a system environmental manager (e.g., 130, FIG. 1.2), the information handling system environmental manager (e.g., 119, FIG. 1.1), and/or the environmental chassis manager (214). Other components of the system illustrated in FIGS. 1.1-2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, components associated with an information handling system (IHS) are in communication with the system environmental manager (e.g., 130, FIG. 1.2), the information handling system environmental manager (e.g., 119, FIG. 1.1), and/or the environmental chassis manager (214). The components may include, for example, computing components, storage components, sensor components, environmental control components, or any other components disposed within an IHS or building including IHSs.

In step 302, it is determined that one of the components is having a communication failure, which can include a determination that no data is being received, the received data is deemed unreliable, different data streams are contradictory, or any other issue that may cause the data to be untrustworthy. For example, communication with a temperature sensor may be determined to have a failure if the sensor is transmitting no data, the sensor is transmitting data that should be impossible (e.g., a thousand degrees above normal), and/or the sensor is transmitting data that contradicts with several other nearby temperature sensors.

In step 304, a zone associated with the component having a communication failure is identified. The system environmental manager (e.g., 130, FIG. 1.2), the information handling system environmental manager (e.g., 119, FIG. 1.1), and/or the environmental chassis manager (214), and/or another entity may maintain a data structure that maps each component to a zone. As discussed above, components associated with the IHS are distributed amongst multiple zones. Each zone may include any number and/or variety of components. For example, one zone may contain a portion of the components contained within a single chassis and another zone may contain all of the components contained within multiple chassis. Further, the zones may be constructed logically within a manager or other control system, or the zones may be constructed physically using terminals.

In step 306, it is determined whether a zone is considered critical. Generally, a zone is considered critical if loss of control of the zone is likely to cause a loss of control of other zones. In particular, a zone may be designated critical by a user beforehand, or the criticality of the zone may be determined based on heuristics and algorithms implemented by the system environmental manager (e.g., 130, FIG. 1.2), the information handling system environmental manager (e.g., 119, FIG. 1.1), and/or the environmental chassis manager (214). For example, a zone may be considered critical if a percentage of the total number of components associated with the identified zone is above a threshold value. Further, a zone may be considered critical if the identified zone entering a safe mode causes a loss in an ability to predict and/or control one or more components located in another zone. These examples are not intended to limit the scope of the invention.

If it is determined that the identified zone is a critical zone, then the method proceeds to step 308. In step 308, all components associated with the IHS are instructed to enter a safe mode. The safe mode is a state in which components are run in an unoptimized state to allow continued operation of the IHS, but with no feedback control over the environmental conditions. The method may end following step 308.

If it is determined that the identified zone is not a critical zone, then the method proceeds to step 310. In step 310, it is determined whether the number of zones associated with a component having a communication failure is above a threshold. A threshold may be established at one, two, three, or any other number of zones. A zone having a communication failure causes a degradation in the ability for a system to actively control other zones that are not having a communication failure. Thus, once the threshold number of zones having a communication failure is exceeded, the system may be unable to provide active control for the other zones.

Further, the threshold may be dependent on which zones are having a communication failure. For example, the threshold could be a percentage of the total number of components associated with the IHS. In another embodiment, each zone may be assigned a failure value and the threshold may include the total sum of the failure values assigned to zones having a communication failure. In yet another embodiment, the threshold may include a level of reduction in an ability to estimate environmental conditions in zones not having a communication failure.

If it is determined that the number of zones associated with a component having a communication failure is above a threshold, then the method proceeds to step 308. In step 308, all components associated with the IHS are instructed to enter a safe mode. The method may end following step 308.

If it is determined that the number of zones associated with a component having a communication failure is below a threshold, then the method proceeds to step 312. In step 312, all components within the zone associated with the component having a communication failure are identified.

In step 314, all components within the zone associated with the component having a communication failure are instructed to enter a default mode in which components are treated as having experienced conventional hardware failures (e.g., a short-circuited sensor, a jammed damper, etc.) and the system responds accordingly. As an example of a default mode, a controller may determine that a voltage feedback of a damper is experiencing a communication failure. Even if the damper is operating properly, the controller cannot validate the communication. In a safe mode, the damper may lose active control and spring to an open position. In the default mode, the damper may be allowed to continue to operate despite the communication failure. The method may end following step 314.

It may be useful to provide an example to further clarify step 310. For example, the threshold number of zones may be three zones. As such, when three, non-critical zones are having a communication failure, then the method proceeds to step 308. For example, when a first non-critical zone has a communication failure, the method proceeds through to step 314 and all of the components in the first, non-critical zone are instructed to enter a default mode. Then, when a second non-critical zone has a communication failure, the method proceeds through to step 314 again and all of the components in the second, non-critical zone are also instructed to enter a default mode. Thus, at this hypothetical point in time, both the first, non-critical zone and the second, non-critical zone are in the default mode while all other zones are in normal operating conditions. Then, when a third, non-critical zone has a communication failure, the threshold is reached and the method proceeds to step 308 in which all of the components associated with the IHS are instructed to enter a safe mode.

Figure 4:
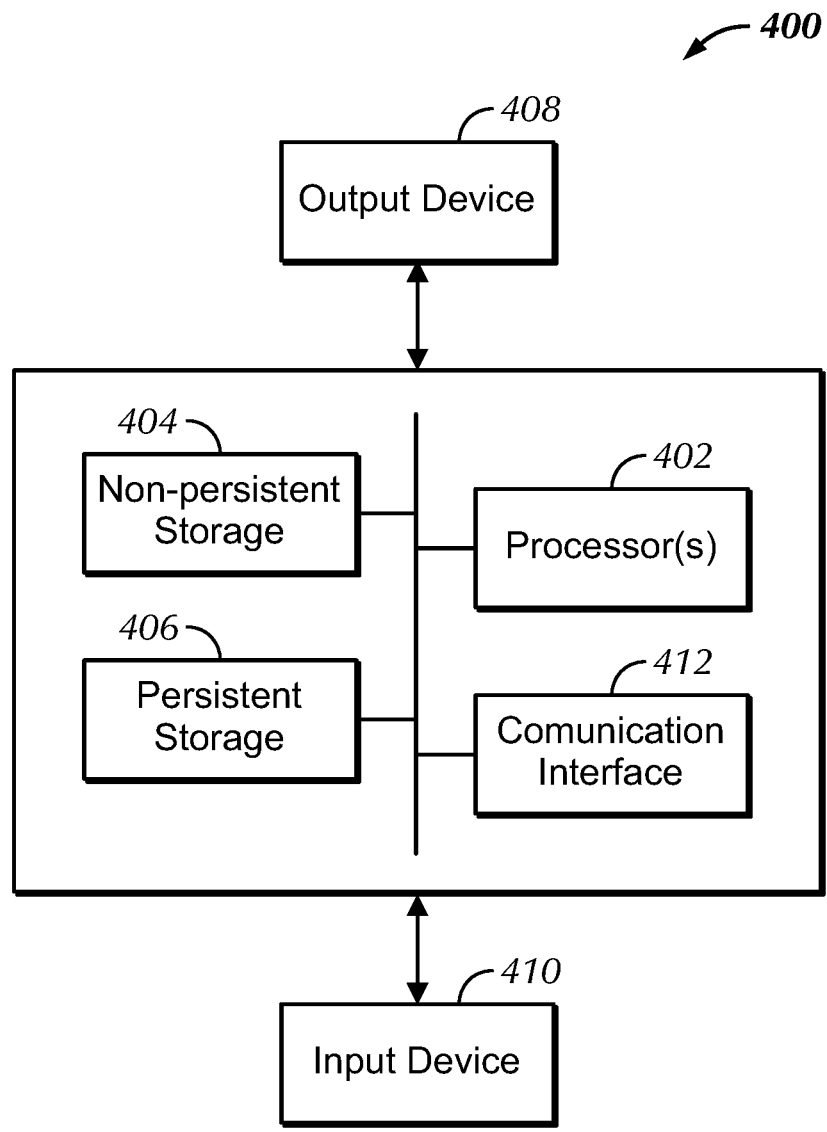
FIG. 4 shows a diagram of a computing device in accordance with one or more embodiments of the invention.

Embodiments of the invention may be implemented using a computing device. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide an improved method for managing environmental conditions of an IHS. Specifically, embodiments of the invention may provide a method and system for managing the environmental conditions of an IHS when one or more components within the IHS experience a communication failure. To do so, embodiments of the invention may provide a method and system that enables a portion of the components associated with the IHS to run in a safe mode, while other components are able to maintain normal operations. By doing so, the environmental conditions experienced by the IHS can be actively controlled for longer periods of time and in spite of communication failures occurring within the IHS.

Thus, embodiments of the invention may address the problem of unexpected communication failures causing prolonged unoptimized operation of IHSs. Further, embodiments of the present invention may isolate communication failures to smaller portions of the total number of components in an IHS, may reduce time spent in a safe mode for all components, may lower IT failure rates due to components operating in adverse environmental conditions, may reduce the complexity of safe mode operations, may reduce costs in implement redundant control systems, and/or may increase resiliency.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the computing device (400). Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An information handling system comprising:
a plurality of components;
a plurality of zones, wherein each zone comprises a portion of a total number of the components; and
a processor programmed to:
   determine that a communication failure has occurred with one of the components of the information handling system;
   identify a zone of the plurality of zones comprising the one of the components;
   determine whether the zone is considered critical by determining at least one of the following:
      whether communications received from components of other zones provide data that enables the processor to estimate data lost due to the communication failure is above a threshold error level, and
      whether the communication failure causes loss in an ability to actively control one or more of the components outside the zone;
   instruct all of the zones to switch to a safe mode based upon determining that the zone is considered critical; and
   instruct the zone to switch to a default mode.

2. The information handling system of claim 1, wherein the processor is further programmed to:
determine a number of zones of the plurality of zones that contains at least one component having a communication failure, upon determining that the zone is not considered critical; and
instruct all of the zones to switch to a safe mode based upon determining that the number of zones is above a threshold value.

3. The information handling system of claim 1, wherein the processor is further programmed to:
determine a level of reduction in an ability of the processor to estimate environmental conditions in response to the zone being in the default mode, upon determining that the zone is not considered critical; and
instruct all of the zones to switch to a safe mode based upon determining that the level is above a threshold value.

4. The information handling system of claim 1, wherein the processor is further programmed to:
adjust an operation of the other zones of the plurality of zones in response to instructing the zone to switch to the default mode.

5. A method for managing component level operations of an information handling system, comprising:
creating a plurality of zones wherein each zone comprises a portion of a total number of components contained within the information handling system;
determining that a communication failure has occurred with one of the components of the information handling system;
identifying a zone of the plurality of zones comprising the one of the components;
determine whether the zone is considered critical by determining at least one of the following:
   whether communications received from components of other zones provide data that enables the processor to estimate data lost due to the communication failure is above a threshold error level, and
   whether the communication failure causes loss in an ability to actively control one or more of the components outside the zone;
instruct all of the zones to switch to a safe mode based upon determining that the zone is considered critical; and
instructing the zone to switch to a default mode.

6. The method of claim 5, further comprising:
determining a number of zones of the plurality of zones that contains at least one component having a communication failure, upon determining that the zone is not considered critical; and
instructing all of the zones to switch to a safe mode based upon determining that the number of zones is above a threshold value.

7. The method of claim 5, further comprising:
determining a level of reduction in an ability of the information handling system to estimate environmental conditions in response to the zone being in the default mode, upon determining that the zone is not considered critical; and instructing all of the zones to switch to a safe mode based upon determining that the level is above a threshold value.

8. The method of claim 5, further comprising:
adjusting an operation of the other zones of the plurality of zones in response to instructing the zone to switch to the default mode.

9. A non-transitory computer readable medium comprising computer readable program code, which when executed by a computer processor enables the computer processor to perform a method for monitoring environmental conditions at a component of an information handling system, the method comprising:
creating a plurality of zones wherein each zone comprises a portion of a total number of components contained within the information handling system;
determining that a communication failure has occurred with one of the components of the information handling system;
identifying a zone of the plurality of zones comprising the one of the components;
determining whether the zone is considered critical by determining at least one of the following:
whether communications received from components of other zones provide data that enables an estimation of data lost due to the communication failure is above a threshold error level, and
whether the communication failure causes loss in an ability to actively control one or more of the components outside the zone;
instructing all of the zones to switch to a safe mode based upon determining that the zone is considered critical; and
instructing the zone to switch to a default mode.

10. The non-transitory computer readable medium of claim 9, wherein the method further comprises:
determining a number of zones of the plurality of zones that contains at least one component having a communication failure, upon determining that the zone is not considered critical; and
instructing all of the zones to switch to a safe mode based upon determining that the number of zones is above a threshold value.

11. The non-transitory computer readable medium of claim 9, wherein the method further comprises:
adjusting an operation of the other zones of the plurality of zones in response to instructing the zone to switch to the default mode.

* * * * *